March 11, 1952 J. F. BOLTON 2,588,475
FILTER BED

Filed Sept. 4, 1946 3 Sheets-Sheet 1

Inventor:
JAMES. F. BOLTON
BY Francis E. Boyce
ATTORNEY

March 11, 1952  J. F. BOLTON  2,588,475
FILTER BED

Filed Sept. 4, 1946  3 Sheets-Sheet 2

Inventor:
JAMES. F. BOLTON
BY Francis E. Boyce
ATTORNEY

Inventor:
JAMES F. BOLTON
BY Francis E. Boyer
ATTORNEY

Patented Mar. 11, 1952

2,588,475

UNITED STATES PATENT OFFICE 2,588,475

FILTER BED

James Frankland Bolton, Moss Ironworks, Heywood, England, assignor to Ames Crosta Mills & Company Limited, Heywood, England, a British company Application September 4, 1946, Serial No. 694,786
In Great Britain September 10, 1945

2 Claims. (Cl. 210—7)

1

This invention relates to filtering means for fluids such as sewage, of the kind comprising a filter bed and sprinkler means for distributing the fluid over the bed.

One of the problems in connection with sewage filter beds is that after a period of use the top of the bed becomes coated with a deposit which reduces the filtering capacity of the bed. To meet this problem a system of alternating series filtration known as alternating double filtration has been evolved using two filter beds in series and changing periodically the delivery thereto so that each bed in turn has a period during which the sewage flows to it after passing through the other bed, and during which period the surface previously having received and holding a deposit is effectively cleaned.

The object of the present invention is to enable the principle aforesaid of alternating series filtration to be employed with a single filter bed.

According to the invention, filtering means for fluids, such as sewage, comprises a filter bed, a sprinkler means constructed for distributing fluid separately over at least two pre-determined defined areas of the bed, and means within the filter bed for collecting the fluid separately from each of said defined areas.

In the example of the invention shown in Figs. 1 to 5 of the drawings an annular filter bed with outer and inner walls $a$ and $b$ has its base divided into two equal areas $c^1$ and $c^2$ by an annular rib $c$. Also the centre area $c^2$ formed by the rib is given a fall towards the inner wall $b$ whilst the outer area $c^1$ is given a fall towards the outer wall $a$. The inner and outer walls $b$ and $a$ have apertures $b^1$ and $a^1$ to allow the filtered sewage to pass through, and annular receiving channels $b^2$ and $a^2$ are provided adjacent to such walls. The sprinkler has two pairs of arms, one pair $e$ of which are shorter than the other pair $d$, the shorter pair being adapted to distribute over the centre area $c^2$ substantially the same as defined by the annular rib $c$ on the base afore-

Figure 1:
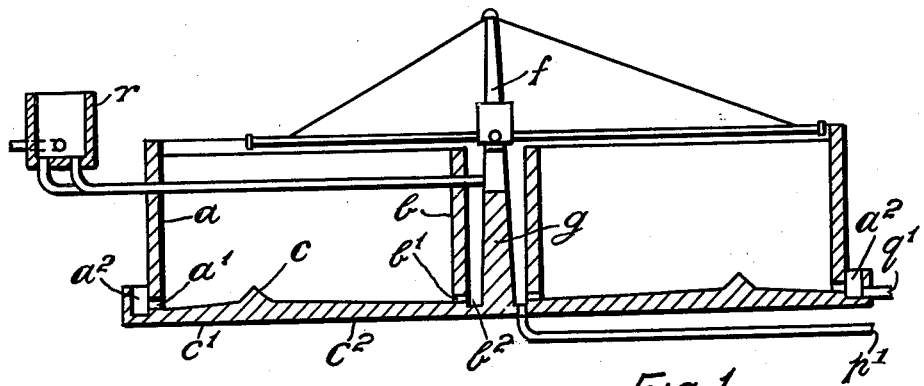
Fig. 1 is a sectional side elevation of one example of a filter bed made in accordance with the invention.
Figure 5:
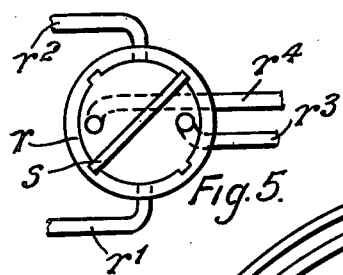
Fig. 5 is a detail plan of the distribution chamber shown in Figs. 1 and 2.
Figure 2:
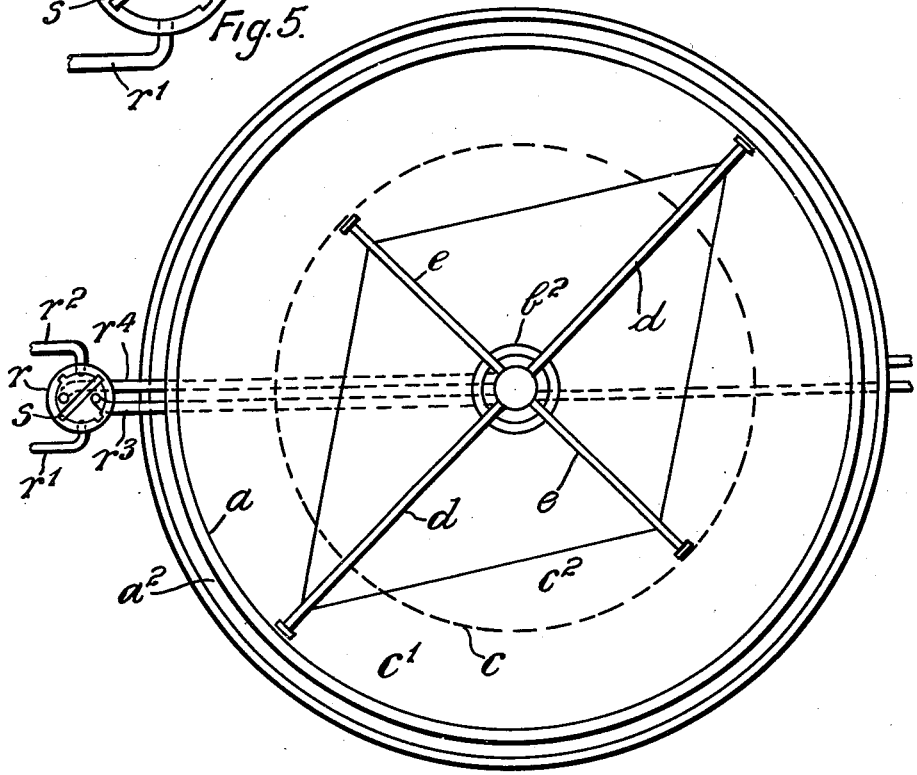
Fig. 2 is a plan of Fig. 1.
Figures 3, 4:
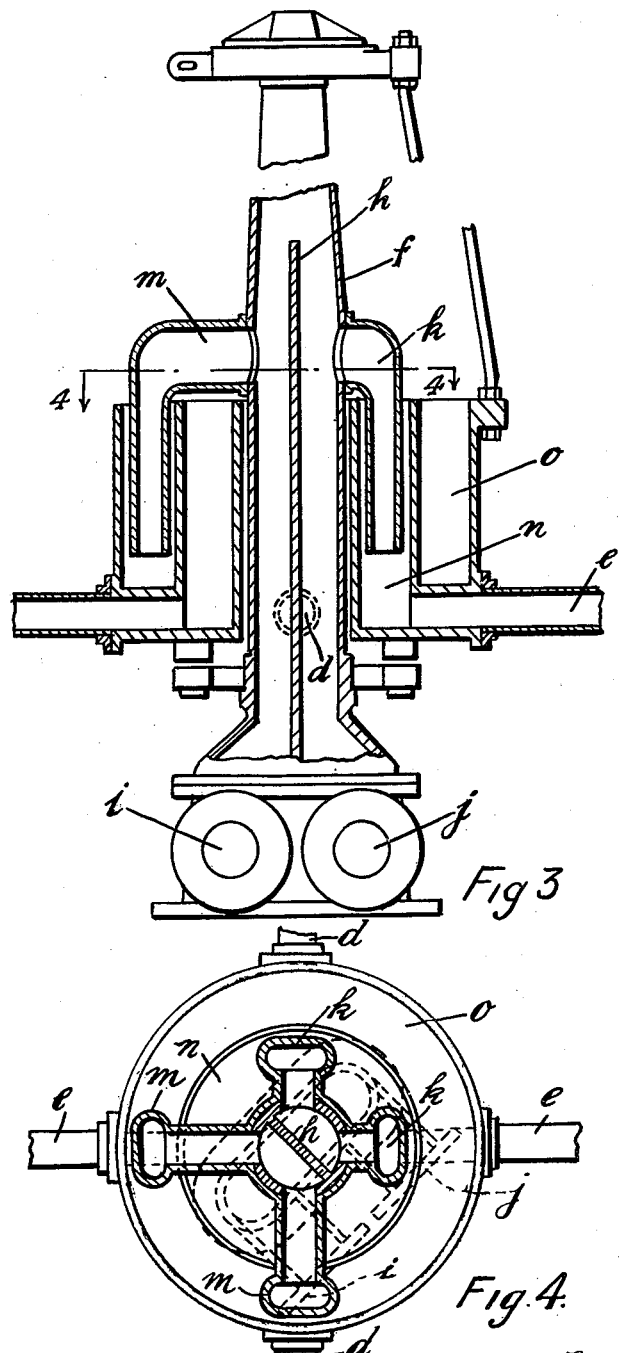
Fig. 3 is a sectional elevation showing details of the centre column of the sprinkler shown in Figs. 1 and 2.
Fig. 4 is a part sectional plan of Fig. 3 taken on lines 4—4.

2 said, and the longer pair of arms being constructed to distribute over the area $c^1$ outside that covered by the shorter arms. The sprinkler is mounted for rotation on a central tubular pillar $f$ mounted on a column $g$ in the centre of the base of the bed. As shown in Figs. 3 and 4 the tubular pillar $f$ is divided longitudinally by a partition $h$ and is provided at its lower end with separate connections $i$ and $j$ for each passage in the pillar formed by the longitudinal partition $h$ and extending from the side of the pillar are two pairs of depending outlet tubes $k$ and $m$, two for each passage the tubes of each pair being arranged at right angles to one another and diammetrically opposite to one another pair. The sprinkler is provided with concentric and adjacent inner and outer annular troughs $n$ and $o$, the depending outlet tubes $k$ and $m$ aforesaid depending into the troughs $n$ and $o$ respectively. The trough $n$ is shown with the shorter pair of sprinkler arms $e$ connected thereto, whilst the other trough $o$ has the sprinkler arms $d$ (one of which is shown dotted) connected to it.

Figure 6:
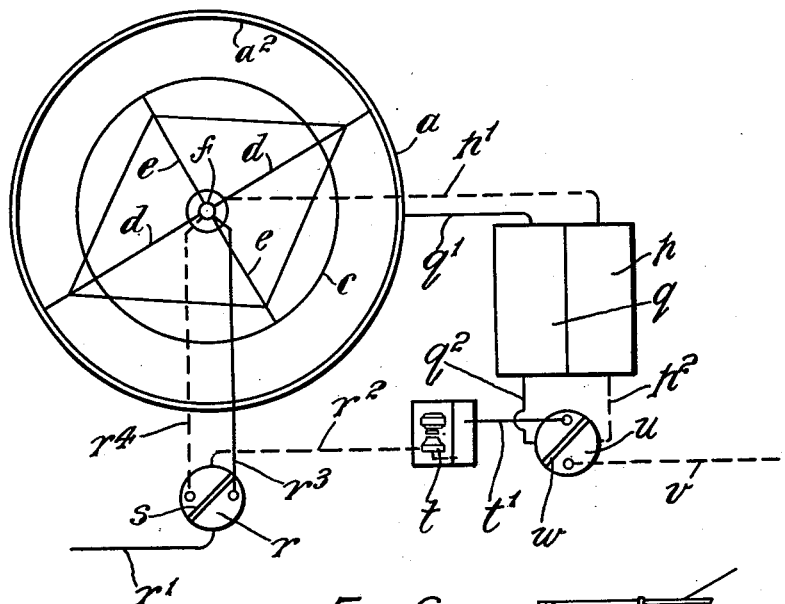
Figs. 6 and 7 are circulation plan diagrams.
Figure 8:
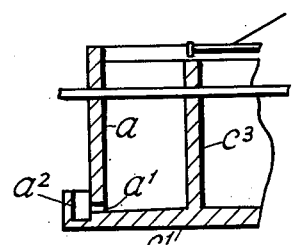
Figure 7:
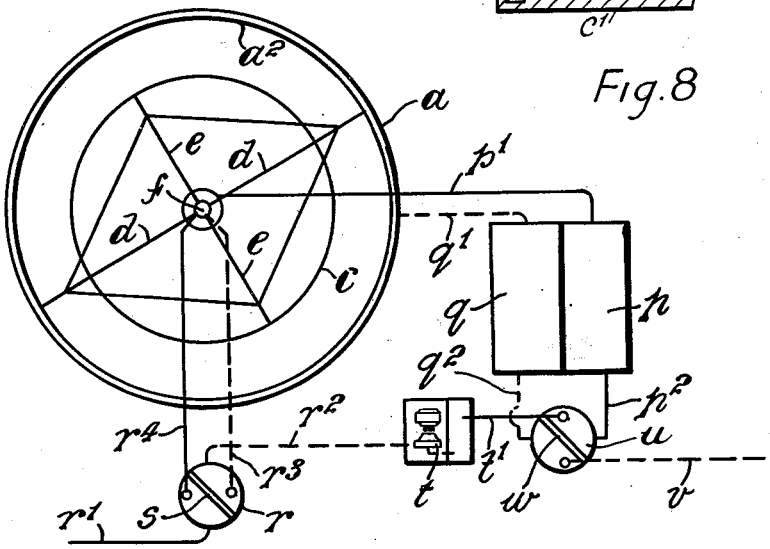

As shown in Figs. 6 and 7, adjacent the filter bed are two humus or settling tanks $p$ and $q$, that is to say tanks such as are used to settle the effluent from the filter beds, each of said tanks being connected at one end by an inlet pipe $p^1$ and $q^1$ respectively to the inner and outer receiving channels $b^2$ and $a^2$ aforesaid. Each of said settling tanks has at its other end a weir (not shown) and outlet pipe $p^2$ and $q^2$. Also, adjacent the filter bed is a small circular distributing valve $r$ (see particularly Fig. 5) having a vertical partition $s$ which can be placed therein in two alternative positions at right angles and diammetrically of the chamber. At one side of the distributing valve is an inlet $r^1$ for receiving the sewage from the usual settling tank (not shown). Opposite to it is a second inlet connection $r^2$ whilst from the base are two outlet connections $r^3$ and $r^4$ disposed at 90 degrees to the said inlets and each connected respectively to the connections $i$ and $j$ aforesaid at the base of the sprinkler pillar. The vertical partition $s$ in the distributing valve is adapted to be positioned in either of two positions relatively at 45 degrees to the said inlet and outlet connections. The second inlet connection $r^2$ is connected to the delivery side of a pump $t$, the suction side of which is connected by a pipe $t^1$ to an adjustable collecting valve $u$, similar to the valve $r$, adjacent the settling tanks $p$ and $q$ so as to draw therefrom. The outlets $p^2$ and $q^2$ from the settling tanks are connected to the collecting valve $u$ at opposite sides thereof and at 90 degrees to the pipe connection $t^1$, whilst a final effluent outlet pipe $v$ is connected to the collecting valve diametrically opposite to the pipe connection $t^1$. A partition $w$ is provided in the collecting valve so that it may be placed in either of two alternative positions at 45 degrees to the pipe connections.

In operation, the vertical partition $s$ in the distributing valve $r$ may be positioned as shown in Fig. 6 so that the sewage flows to the longer arms $d$ of the sprinkler through the pipe $r^3$ to connection $i$ depending tubes $m$ and trough $o$. The sewage after filtration through the outer portion of the filter bed flows from the outer receiving channel $a^2$ to the settling tank $q$. The partition $w$ is set to connect the outlet pipe $q^2$ from such settling tank to the pipe $t^1$ of the pump, the delivery side of which is connected by the pipe $r^2$ to second inlet of the distributing valve $r$ so that it enters the valve $r$ on the other side of the vertical partition $s$ therein relative to the first inlet $r^1$ from which valve it flows by pipe $r^4$, connection $j$, depending tubes $k$ and trough $n$ to the shorter pair of the sprinkler arms $e$, through the inner area of the filter bed, through the inner wall $b$ to the inner receiving channel $b^2$ and therefrom to the other settling tank $p$ and from it by pipe $p^2$ to collecting valve $u$ to the outlet $v$. When the filter bed has been working on this cycle for a sufficient time it may be changed over to the alternative cycle by changing the position of the vertical partitions $s$ and $w$ in the distributing and collecting valves. This change of cycle enables the single filter bed to work on the alternating series filtration principle aforesaid. By removing the vertical partitions in the distributing and collecting valves and without using the pump, the filter bed and settling tanks could be used as a direct single filtration.

I declare that what I claim is:

1. Filtering means for fluid sewage, comprising an annular filter structure, a bed of filtering material therein, a column disposed centrally of said structure, pairs of long and short arms rotatably mounted on said column for distributing fluid separately on to inner and outer concentric areas of the filter bed, a shallow annular raised rib on the floor of the structure dividing said floor into concentric areas complementary to the said concentric distributing areas of the bed, an outer collecting channel encircling the structure and communicating with the outer area of the said floor, an inner collecting channel communicating with the inner area of said floor, means for delivering a primary fluid to be filtered selectively to one of the pairs of distributing arms, means for collecting secondary fluid from below the area covered by such distributing arms, and means for delivering such secondary fluid to the other pair of distributing arms, in combination with a four-way distributing valve having two inlet and two outlet connections and an adjustable partition so disposed that each inlet may be connected to either outlet while the other inlet is connected to the other outlet, tubular means connecting the outlets respectively to the short and long distributing arms, a pair of settling tanks connected respectively to the inner and outer collecting channels, a four-way collecting valve having two inlet and two outlet connections and an adjustable partition so disposed that each inlet may be connected to either outlet while the other inlet is connected to the other outlet, outlet means for the settling tanks connected to the inlets of said collecting valve, a final discharge duct connected to one outlet of the collecting valve, a pump, means connecting the other outlet of the collecting valve to the inlet side of the pump, means connecting the delivery side of the pump to one inlet of the distributing valve, and means for supplying fluid to be filtered to the other inlet of the distributing valve.

2. Filtering means according to claim 1, in combination with adjustable means for connecting the collecting channel of one area to the distributing arm of the other area and for connecting the other collecting channel and distributing arm respectively to discharge, the fluid supply means being such that the filtering areas may be used in alternating series filtration.

JAMES FRANKLAND BOLTON.

REFERENCES CITED

The following references are of record in the file of this patent:

UNITED STATES PATENTS

| Number | Name | Date |
|---|---|---|
| 956,665 | Ashley | May 3, 1910 |
| 2,073,441 | Blunk | Mar. 9, 1937 |
| 2,142,196 | Langdon | Jan. 3, 1939 |
| 2,308,866 | Dekema | Jan. 19, 1943 |
| 2,340,842 | Reybold et al. | Feb. 1, 1944 |
| 2,355,760 | Trebler | Aug. 15, 1944 |
| 2,419,693 | Short et al. | Apr. 29, 1947 |

FOREIGN PATENTS

| Number | Country | Date |
|---|---|---|
| 369,295 | Great Britain | Mar. 24, 1932 |